C. G. LUNDSTROM.
FERTILIZER DROPPING DEVICE.
APPLICATION FILED AUG. 9, 1917.
1,270,849.
Patented July 2, 1918.
2 SHEETS—SHEET 2.
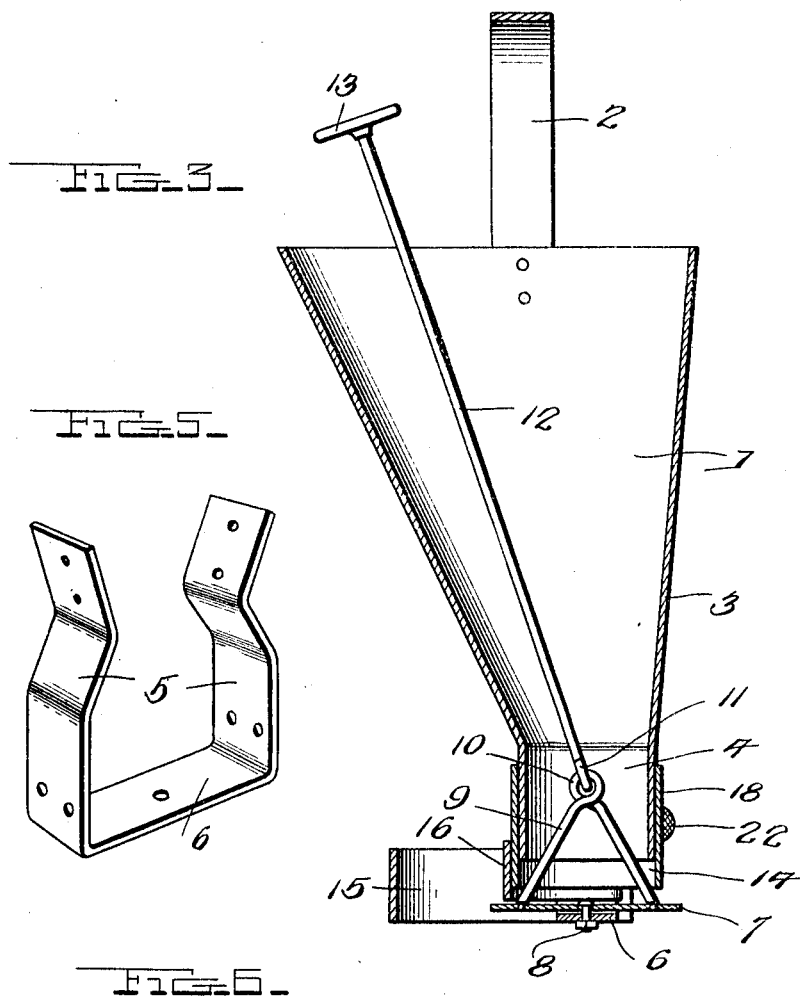
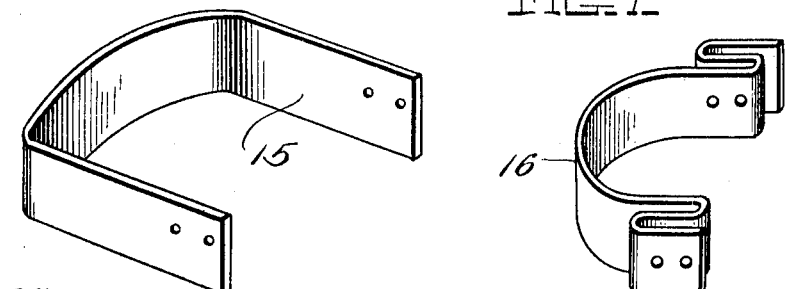
Witness
J. R. Pierce
Inventor
C. G. Lundstrom
By H. R. Wilson & Co.
Attorneys

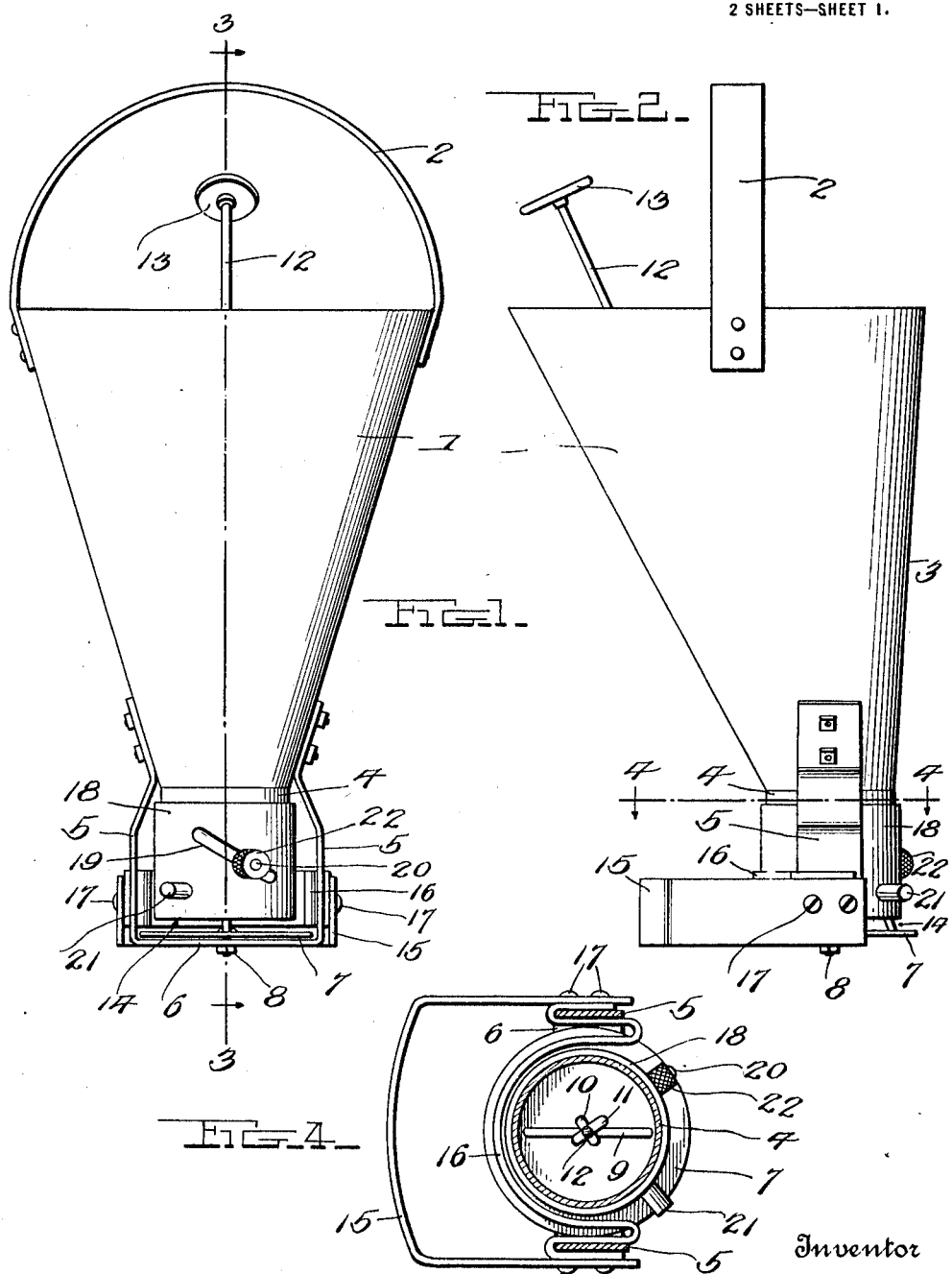

UNITED STATES PATENT OFFICE.

CHARLES G. LUNDSTROM, OF VERO, FLORIDA.

FERTILIZER-DROPPING DEVICE.

1,270,849.

Specification of Letters Patent.

Patented July 2, 1918.

Application filed August 9, 1917. Serial No. 185,330.

*To all whom it may concern:*

Be it known that I, CHARLES G. LUNDSTROM, a citizen of the United States, residing at Vero, in the county of St. Lucie and State of Florida, have invented certain new and useful Improvements in Fertilizer-Dropping Devices; and I do declare the following to be a full, clear, and exact description of the invention, such as will enable others skilled in the art to which it appertains to make and use the same.

My invention relates to improvements in fertilizer dropping devices and has for its principal object to provide a hand-operated device of this class which may be easily and inexpensively manufactured and marketed, yet highly efficient and durable.

With the foregoing general object in view, the invention resides in certain novel features of construction and unique combinations of parts to be hereinafter fully described and claimed, the descriptive matter being supplemented by the accompanying drawings which form a part of this specification and in which:

Figure 1 is a front elevation of the device;

Fig. 2 is a side elevation thereof;

Fig. 3 is a vertical section on the plane of the line 3—3 of Fig. 1;

Fig. 4 is a horizontal section on the plane designated by the line 4—4 of Fig. 2; and Figs. 5, 6 and 7 are perspective views of the supporting legs, the foot, and the shield, respectively.

In the drawings above briefly described the numeral 1 designates a bucket or hopper having a preferably rigid handle 2 whereby it may be carried around by the operator, the lower end of said hopper being provided with a fertilizer discharge means. In order that the operator may readily see the manner in which the fertilizer is being discharged and may cut off the supply when required, one side 3 of the hopper is by preference disposed in a substantially vertical plane, whereas the remaining sides incline downwardly and inwardly to the cylindrical portion 4 at the extreme lower end of the device.

A pair of metal legs 5 are secured to the hopper 1 and depend a slight distance below the lower end thereof, the lower extremities of said legs being connected by a horizontal bar 6 which is by preference formed integrally therewith, said member serving as a support for a horizontally rotatable feed member in the form of a disk 7, a rivet or the like being employed for rotatably connecting said member to said bar.

A yoke or arch 9 rises from the disk 7 above the hopper 1 and is preferably formed of heavy wire, the wire at the crown of said arch being twisted to form an eye 10 with which an additional eye 11 on the lower end of an operating rod 12 is loosely engaged, said rod rising above the hopper 1 and having a suitable knob or other appropriate handle 13 on its upper end within convenient reach of the operator. It will be observed that the disk 7 is spaced downwardly from the lower end of the hopper 1 to provide an annular space 14 through which the fertilizer is discharged when the disk 7 is rotated by operation of the knob 13. During this operation, the arch 9 serves as an agitator to prevent the material from clogging at the outlet of the device, said arch also acting as means for universally connecting the rod 12 with the feed disk 7, so that said rod may be swung to the most convenient angle for operation.

Secured in any preferred manner to the lower ends of the legs 5 is a horizontally disposed U-shaped supporting foot 15, said foot extending away from the vertical side 3 of the hopper 1 so that it will effectively support the entire device in upright position when required. The ends of a U-shaped shield 16 are also secured to the legs 15 and by preference bolts or the like 17 are employed for securing the two parts 15 and 16 in place, the latter being detachable whenever it is required that the full circumference of the space 14 shall be exposed, but otherwise serving to close said space throughout a portion of its circumference, so that the fertilizer will be discharged only at the front side of the device.

Preferably employed in connection with the features of construction above described, is a valve sleeve 18 which is rotatable and slidable on the lower end 4 of the hopper 1, said sleeve being movable toward and away from the disk 7 for controlling the amount of fertilizer fed from the hopper. Any preferred means could be provided for adjusting the sleeve 18, but said sleeve is in most cases formed with an inclined slot 19 through which a stud 20 projects from the hopper, whereby turning of said sleeve by means of the handle 21, will raise or lower said sleeve, according to the direction of rotation. When the proper adjustment has been attained, a nut 22 on the stud 20 may be tightened to lock the sleeve against further movement.

By constructing the improved device as or substantially as shown and described it may be easily and inexpensively manufactured and marketed, yet will be highly efficient and durable. Since probably the best results are obtained from the specific details shown and described, such details constitute the preferred embodiment of the device, but I wish it to be understood that within the scope of the invention as claimed numerous minor changes may well be made without sacrificing the principal advantages.

I claim:

1. A fertilizer dropper comprising a hopper open at its lower end, a rotatable feed member permanently located at the lower end of said hopper, a yoke rising from said feed member and having an eye at its crown, and an operating rod in said hopper having at its lower end an eye engaged loosely with said first named eye, the upper end of said rod having a handle.

2. A fertilizer dropper comprising a hopper having an open lower end, a horizontally rotatable feed member spaced below said hopper to provide an annular discharge space, a pair of legs secured to opposite sides of said hopper, a horizontally disposed U-shaped supporting foot secured at its ends to said legs, and a horizontal U-shaped shield adapted to be secured to said legs for closing said discharge space throughout a portion of its circumference.

3. A fertilizer dropper comprising a hopper substantially vertical on one side and inclined downwardly and inwardly on its other sides, a carrying handle at the upper end of said hopper, discharge means at the lower end of said hopper, and an operating rod rising through said hopper and universally connected to said discharge means, the upper end of said rod having a handle adjacent said carrying handle.

4. A fertilizer dropper comprising a hopper substantially vertical on one side and inclined downwardly and inwardly on its other sides, a carrying handle at the upper end of said hopper, discharge means at the lower end of said hopper, means adjacent said handle for operating said discharge means, and a horizontal earth engaging supporting foot on said lower end of the hopper and extending away from said vertical side.

In testimony whereof I have hereunto set my hand in the presence of two subscribing witnesses.

CHARLES G. LUNDSTROM.

Witnesses:
ELSEBETH L. MARTENS,
HELEN DALY.

Copies of this patent may be obtained for five cents each, by addressing the "Commissioner of Patents, Washington, D. C."